(12) United States Patent
Szczepanski et al.

(10) Patent No.: US 11,286,833 B2
(45) Date of Patent: Mar. 29, 2022

(54) SYSTEMS AND METHODS FOR DETECTING STRUCTURAL AND OPERATIONAL STATES OF A COMPONENT OF AN EXHAUST AFTERTREATMENT SYSTEM

(71) Applicant: DENSO International America, Inc., Southfield, MI (US)

(72) Inventors: Edward Szczepanski, Grosse Pointe Farms, MI (US); William Leismer, Madison Heights, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 16/869,987

(22) Filed: May 8, 2020

(65) Prior Publication Data
US 2021/0348541 A1   Nov. 11, 2021

(51) Int. Cl.
| F01N 3/02 | (2006.01) |
| F01N 3/20 | (2006.01) |
| F01N 9/00 | (2006.01) |
| F01N 3/021 | (2006.01) |

(52) U.S. Cl.
CPC .............. *F01N 9/00* (2013.01); *F01N 3/021* (2013.01); *F01N 3/2013* (2013.01); *F01N 2900/08* (2013.01); *F01N 2900/10* (2013.01); *F01N 2900/1402* (2013.01); *F01N 2900/1411* (2013.01); *F01N 2900/16* (2013.01)

(58) Field of Classification Search
CPC .......... F01N 3/021; F01N 3/023; F01N 3/027; F01N 3/035; F01N 3/2013; F01N 9/00; F01N 11/00; F01N 2390/02; F01N 2900/1411; F01N 2900/10; F01N 2900/08; F01N 2900/1402; F01N 2900/16; Y02T 10/12; Y02T 10/40
USPC ......... 60/274, 277, 286, 295, 297, 299–301, 60/311
See application file for complete search history.

(56) References Cited

U.S. PATENT DOCUMENTS

| 7,325,392 | B2 | 2/2008 | Stancovski et al. |
| 9,528,971 | B2 * | 12/2016 | Teranishi ........... G01N 33/0047 |
| 9,605,578 | B1 * | 3/2017 | Qi ........................... F01N 9/002 |
| 2004/0055278 | A1 * | 3/2004 | Miyoshi ............... F02D 41/146 60/272 |
| 2010/0146935 | A1 * | 6/2010 | Chen .................... G01N 27/125 60/276 |
| 2019/0368402 | A1 * | 12/2019 | Barrientos Betancourt ................ F01N 3/0842 |

OTHER PUBLICATIONS

SAE Technical Paper Series 2008-01-0447 by Ralf Moos (Year: 2008).*

* cited by examiner

*Primary Examiner* — Audrey B. Walter
*Assistant Examiner* — Dapinder Singh
(74) *Attorney, Agent, or Firm* — Burris Law, PLLC

(57) ABSTRACT

A method includes providing electric power to an exhaust aftertreatment system component, where the exhaust aftertreatment system component is one of a particulate filter and an electrically heated catalyst. The method includes obtaining an impedance value of the exhaust aftertreatment system component in response to providing the electric power. The method includes determining a structural state of the exhaust aftertreatment system component based on the impedance value.

17 Claims, 5 Drawing Sheets

SYSTEMS AND METHODS FOR DETECTING STRUCTURAL AND OPERATIONAL STATES OF A COMPONENT OF AN EXHAUST AFTERTREATMENT SYSTEM

FIELD

The present disclosure relates to systems and methods for detecting structural and operational states of a component of an exhaust aftertreatment system.

BACKGROUND

The statements in this section merely provide background information related to the present disclosure and may not constitute prior art.

An internal combustion engine (ICE) of a vehicle typically includes an exhaust system to route or handle exhaust gas (i.e., combusted gases) expelled from one or more cylinders of the ICE. Furthermore, an exhaust aftertreatment system in communication with the ICE may be used to treat exhaust gas before it exits the exhaust system, for example, by catalyzing oxidation of carbon monoxide to carbon dioxide, oxidation of hydrocarbons to carbon dioxide and water, and reduction of nitrogen oxides (i.e., NOx) to nitrogen gas.

The exhaust aftertreatment system may include various components that may be damaged by melting, erosion, cracking, among others, during operation of the exhaust aftertreatment system.

SUMMARY

This section provides a general summary of the disclosure and is not a comprehensive disclosure of its full scope or all of its features.

The disclosure provides a method that includes providing electric power to an exhaust aftertreatment system component, where the exhaust aftertreatment system component is one of a particulate filter and an electrically heated catalyst. The method includes obtaining an impedance value of the exhaust aftertreatment system component in response to providing the electric power. The method includes determining a structural state of the exhaust aftertreatment system component based on the impedance value.

The present disclosure provides a system including a processor and a nontransitory computer-readable medium including instructions that are executable by the processor. The instructions include providing electric power to an exhaust aftertreatment system component, the exhaust aftertreatment system component is one of a particulate filter and an electrically heated catalyst. The instructions include obtaining an impedance value of the exhaust aftertreatment system component in response to providing the electric power. The instructions include determining a structural state of the exhaust aftertreatment system component based on the impedance value.

The present disclosure provides a vehicle that includes an exhaust aftertreatment system component, where the exhaust aftertreatment system component is one of a particulate filter and an electrically heated catalyst. The vehicle includes a processor and a nontransitory computer-readable medium including instructions that are executable by the processor. The instructions include providing electric power to the exhaust aftertreatment system component. The instructions include obtaining an impedance value of the exhaust aftertreatment system component in response to providing the electric power. The instructions include determining a structural state of the exhaust aftertreatment system component based on the impedance value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
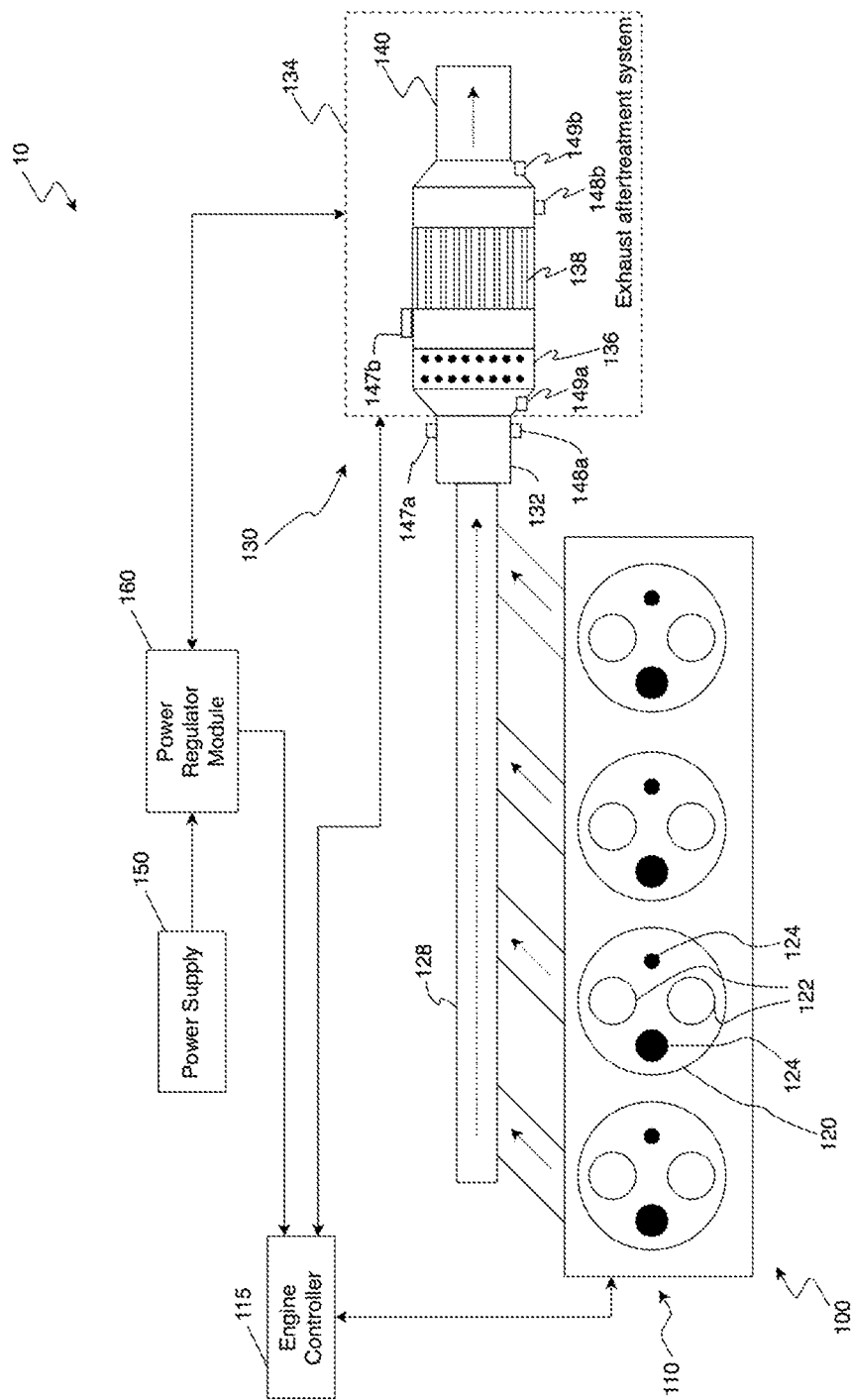
FIG. 1A illustrates a vehicle according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A system for determining structural characteristics and operational characteristics of various components in an exhaust aftertreatment system of an internal combustion engine (ICE) includes a power regulator module and an engine controller. The power regulator module includes various modules that provide electric power to the exhaust aftertreatment system components and obtain an impedance value of the exhaust aftertreatment system components. The engine controller includes various modules that receive particulate sensor data and engine state information, determine a structural or operational characteristic of the exhaust aftertreatment system component, and perform a corrective action based on the structural or operational characteristic. Accordingly, the exhaust aftertreatment system can accurately diagnose component failures without the use of or in conjunction with temperature sensors.

Referring to FIG. 1A, a vehicle 10 that controls and monitors a temperature of a component (e.g., an electrically heated catalyst (EHC), a particulate filter (PF), among others) of the vehicle 10 is shown. In some forms, the vehicle 10 includes an ICE 100, an exhaust system 130, a power supply 150, and a power regulator module 160.

The ICE 100 includes an engine controller 115 and a cylinder bank 110 that includes a plurality of cylinders 120. Each cylinder 120 includes at least two valves 122 (e.g., an intake valve and an exhaust valve), a fuel injector 124, and a spark initiator 126 (e.g., a spark plug). A manifold 128 is in fluid communication with the cylinder bank 110.

The exhaust system 130 includes an exhaust pipe 132 and an exhaust aftertreatment system 134 with various components to filter exhaust gas flowing therethrough. As an example, the exhaust aftertreatment system 134 includes a catalytic converter 136 (e.g., a three-way catalytic (TWC) converter, an EHC converter, among others) and a particulate filter 138 disposed downstream from the catalytic converter 136. While the particulate filter 138 and the catalytic converter 136 are shown as individual components, it should be understood that the particulate filter 138 may be integrated within the catalytic converter 136 in some variations.

Figure 1B:
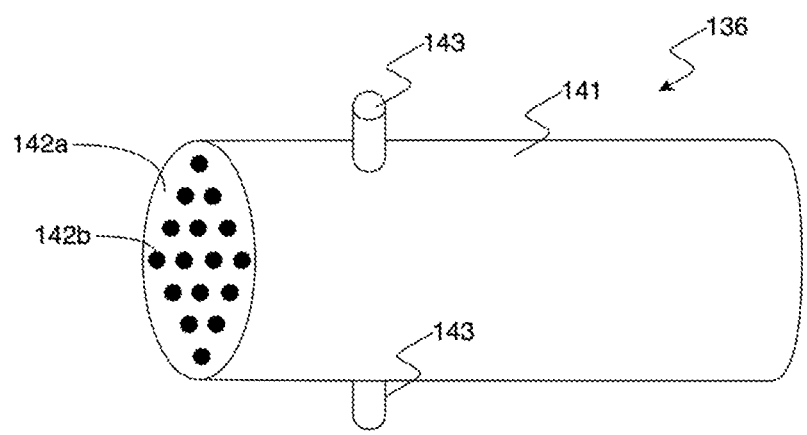
FIG. 1B is an example catalytic converter according to the teachings of the present disclosure.

With reference to FIG. 1B, an example illustration of the catalytic converter 136 is shown. In some forms, the catalytic converter 136 is an EHC converter that includes an electrically conductive portion 141, a substrate 142a, a catalyst material 142b disposed on and supported by the substrate 142a, and electrical leads 143. While two electrical leads 143 are shown, it should be understood that the catalytic converter 136 may include any number of electrical leads 143. In some forms, the electrically conductive portion 141 and the electrical leads 143 include an electrically conductive material that is suitable for operating at predefined temperatures, such as up to 650° C. As an example, the electrically conductive portion 141 and the electrical leads 143 include an electrically conductive material such as nickel, copper, chromium, molybdenum, tungsten, iron, aluminum, boron, silicon, an alloy thereof, among others. The electrically conductive portion 141 may surround the substrate 142a and the catalyst material 142b. For example, in some variations, the electrically conductive portion 141 is a metallic sheet surrounding the substrate 142a. In other variations, the electrically conductive portion 141 includes the electrically conductive material disposed on and/or within the substrate 142a such that an electrical current can flow from one portion or region of the catalytic converter 136 to another portion or region of the catalytic converter 136. In still other variations, the electrically conductive portion 141 can be one or more resistive heating elements disposed on and/or within the substrate 142a.

In at least one variation, the substrate 142a is ceramic material with a honeycomb structure (e.g., a "brick"), and the catalyst material 142b can include platinum group metals (PGMs) (e.g., palladium, platinum, rhodium, among others), disposed on the catalyst material 142b. For example, a washcoat containing PGMs can be applied to the substrate 142a. Accordingly, when the electrically conductive portion 141 receives electrical power from the power supply 150 via the power regulator module 160 and the electrical leads 143, the substrate 142a and/or the catalyst material 142b is heated, thereby enhancing the reduction of the nitrogen oxides (NOx) to nitrogen (N2), the oxidation of carbon monoxide (CO) to carbon dioxide ($CO_2$), and the oxidation of unburnt hydrocarbons (HCs) into $CO_2$ and water ($H_2O$) from exhaust gas flowing through the catalytic converter 136, as described below in further detail.

Figure 1C:
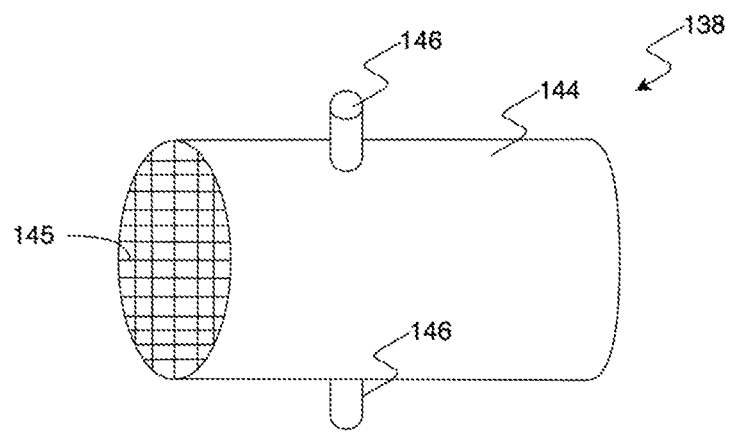
FIG. 1C is an example particulate filter according to the teachings of the present disclosure.

With reference to FIG. 1C, an example illustration of the particulate filter 138 is shown. In some forms, the particulate filter 138 includes an electrically conductive portion 144, a filter element 145, and electrical leads 146. While two electrical leads 146 are shown, it should be understood that the particulate filter 138 may include any number of electrical leads 146. In some forms, the electrically conductive portion 144 and the electrical leads 146 include an electrically conductive material that is suitable for operating at predefined temperatures, such as up to 650° C. As an example, the electrically conductive portion 144 and the electrical leads 146 include a conductive material as described above. The electrically conductive portion 144 may surround the filter element 145. For example, and similar to the catalytic converter 136 describe above, the electrically conductive portion 144 is a metallic sheet surrounding the filter element 145. In other variations, the electrically conductive portion 144 includes the electrically conductive material disposed on and/or within the filter element 145 such that an electrical current can flow from one portion or region of the particulate filter 138 to another portion or region of the particulate filter 138. Accordingly, when the electrically conductive portion 144 receives electrical power from the power supply 150 via the power regulator module 160 and the electrical leads 146, the filter element 145 is heated to assist in oxidation of particulate mass accumulated in the filter element 145, thereby increasing the efficiency of the ICE 100.

With reference to FIG. 1A, the exhaust system 130 includes a pre-converter universal heated exhaust gas oxygen (UHEGO) sensor 147a upstream from the catalytic converter 136 and a post-converter UHEGO sensor 147b disposed downstream from the catalytic converter 136 and upstream from the particulate filter 138. In some variations of the present disclosure, the pre-converter UHEGO sensor 147a and the post-converter UHEGO sensor 147b are disposed in the exhaust pipe 132. The pre-converter UHEGO sensor 147a and the post-converter UHEGO sensor 147b are in communication with the engine controller 115 by way of, for example, a vehicle communication network (not shown) such as a controller area network (CAN), a local interconnect network (LIN), among others. It should be understood that a UHEGO sensor provides real time lambda (λ) values in contrast to simple "rich" and "lean" indicators as with heat exhaust gas oxygen (HEGO) sensors. That is, a UHEGO sensor provides an actual λ value for an exhaust gas flowing past the UHEGO sensor. It should also be understood that as used herein the term "lambda" and the symbol "λ" refer to the air-fuel ratio in an exhaust gas where λ equal to 1.0 ($\lambda=1.0$) refers to the stoichiometric air-fuel ratio (i.e., the exhaust gas contains the exact amount of fuel and air needed for stoichiometric combustion). Also, $\lambda<1.0$ refers to an air-fuel ratio for exhaust gas with more fuel than air needed for stoichiometric combustion (also referred to herein as "rich" or "rich mixture"), and $\lambda>1.0$ refers to an air-fuel ratio for exhaust gas with less fuel than air needed for stoichiometric combustion (also referred to herein as "lean" or "lean mixture"). In some variations, the UHEGO sensors 147a, 147b may be replaced with sensors that generate information indicating that the mixture is one of a "rich mixture" or a "lean mixture" without providing an actual λ value of the exhaust gas.

In some forms, the exhaust system 130 includes at least one PF sensor, illustratively shown as a pre-converter particulate sensor 148a (e.g., a radio frequency (RF) particulate sensor), a post-converter particulate sensor 148b, a pre-converter pressure sensor 149a, and a post-converter pressure sensor 149b. The pre-converter and post-converter particulate sensors 148a, 148b monitor and estimate particulate mass accumulation in the particulate filter 138. The pre-converter and post-converter pressure sensors 149a, 149b measure pressure upstream and downstream from the particulate filter 138, respectively. The pre-converter and post-converter particulate sensors 148a, 148b and the pre-converter and post-converter pressure sensors 149a, 149b are in communication with the engine controller 115 by way of, for example, a vehicle communication network (not shown), such as a CAN, a LIN, among others. The engine controller 115 is configured to calculate an amount of particulate mass in the particulate filter 138 based on sensor data received from at least one of the pre-converter and post-converter particulate sensors 148a, 148b and the pre-converter and post-converter pressure sensors 149a, 149b.

With continued reference to FIG. 1A, the power supply 150 is configured to provide electrical power to various components of the vehicle 10. As an example, the power supply 150 includes a direct current (DC) power source (e.g., a battery) configured to provide DC electrical power. As another example, the power supply 150 includes an alternating current (AC) power source and a rectifier circuit configured to provide the DC electrical power.

The power regulator module 160 includes one or more modules for monitoring an impedance of the particulate filter 138. Additionally, the power regulator module 160 includes one or more modules for controlling a magnitude of the electrical power supplied to the particulate filter 138. The functionality of the power regulator module 160 is described below in further detail with reference to FIG. 2A.

With reference to FIGS. 1A-1C, the operation of the vehicle 10 is now provided. The vehicle 10 is operable in various propulsion modes. As an example, the vehicle 10 is operable in one of an electric propulsion mode, an ICE propulsion mode, or a hybrid propulsion mode (i.e., a combination of the electric propulsion mode and the ICE propulsion mode)).

During the electric propulsion mode, the power supply 150 (and other power electronics systems not shown) generate the propulsion forces to drive (i.e., power or move) the vehicle 10. Furthermore, during the operation of the vehicle 10 in the electric propulsion mode, the ICE 100 is deactivated, as the vehicle 10 is propelled by electrical power from the power supply 150. Accordingly, no exhaust gas flow is directed through the exhaust aftertreatment system 134.

During the ICE propulsion mode, the ICE 100 generates the propulsion forces to drive the vehicle 10. During the hybrid propulsion mode, the power supply 150 (and other power electronics systems not shown) and the ICE 100 generate the propulsion forces to drive the vehicle. Furthermore, during the operation of the vehicle 10 in the ICE propulsion mode or the hybrid propulsion mode, the engine controller 115 directs fuel via the fuel injectors 124 and air via the valves 122 (i.e., intake valves) into each of the cylinders 120. The engine controller 115 also directs firing of each of the spark initiators 126 such that the fuel plus air mixture in each cylinder 120 is combusted and expelled from the cylinders 120 via the valves 122 (i.e., exhaust valves) as exhaust gas (not labeled).

The exhaust gas expelled from the cylinders 120 flows through the manifold 128, the exhaust pipe 132, the catalytic converter 136, and the particulate filter 138, and the exhaust gas exits the exhaust system 130 at outlet 140. As the exhaust gas flows through the exhaust system 130, the catalytic converter 136 provides reduction of NOx to N2, oxidation of CO to $CO_2$, and oxidation of unburnt HCs into $CO_2$ and $H_2O$ (collectively referred to as the treatment of exhaust gas flow).

Figure 2:
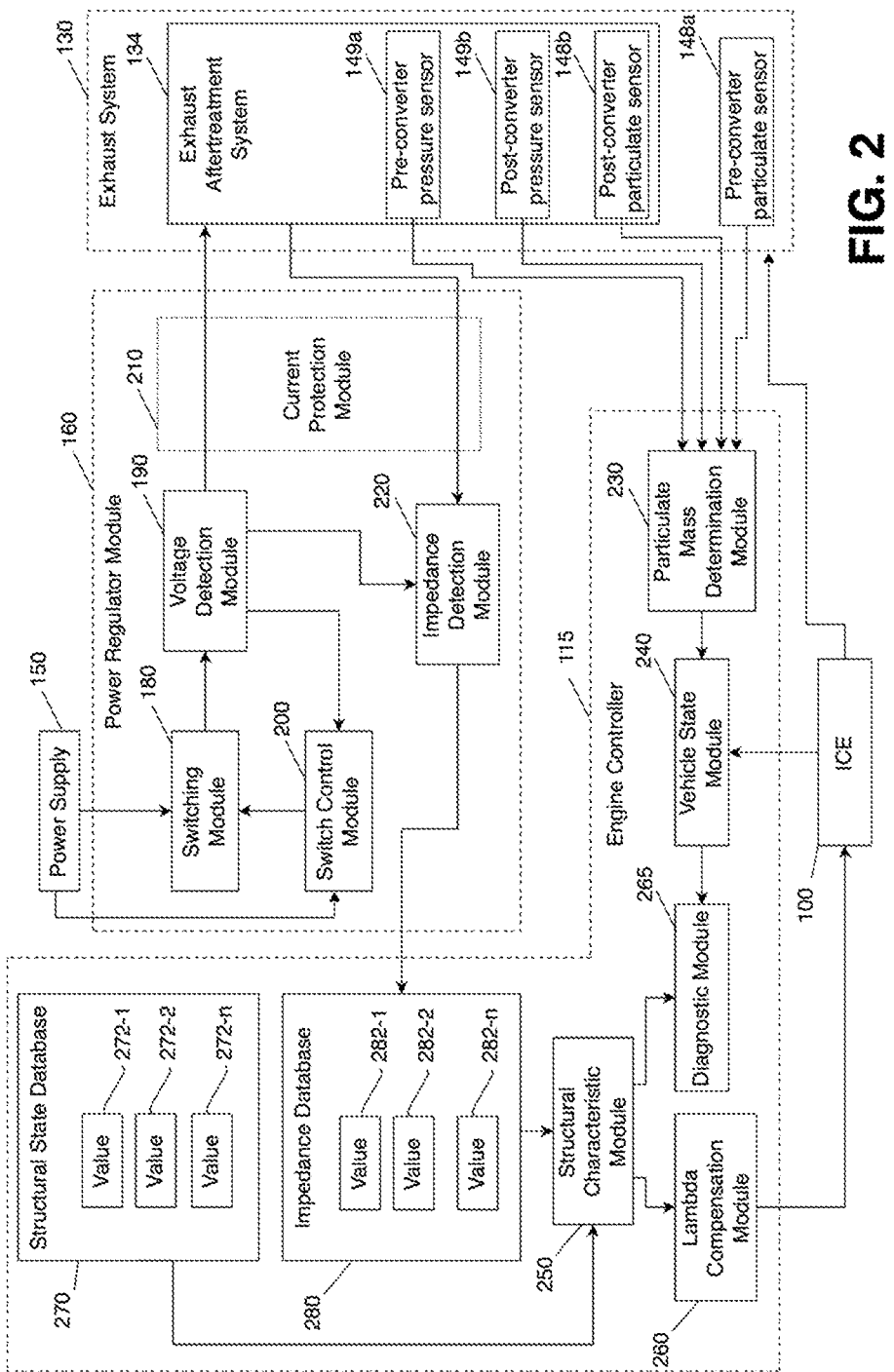
FIG. 2 is a block diagram of a power regulator module, an engine controller, and an exhaust system according to the teachings of the present disclosure.
Figure 3:
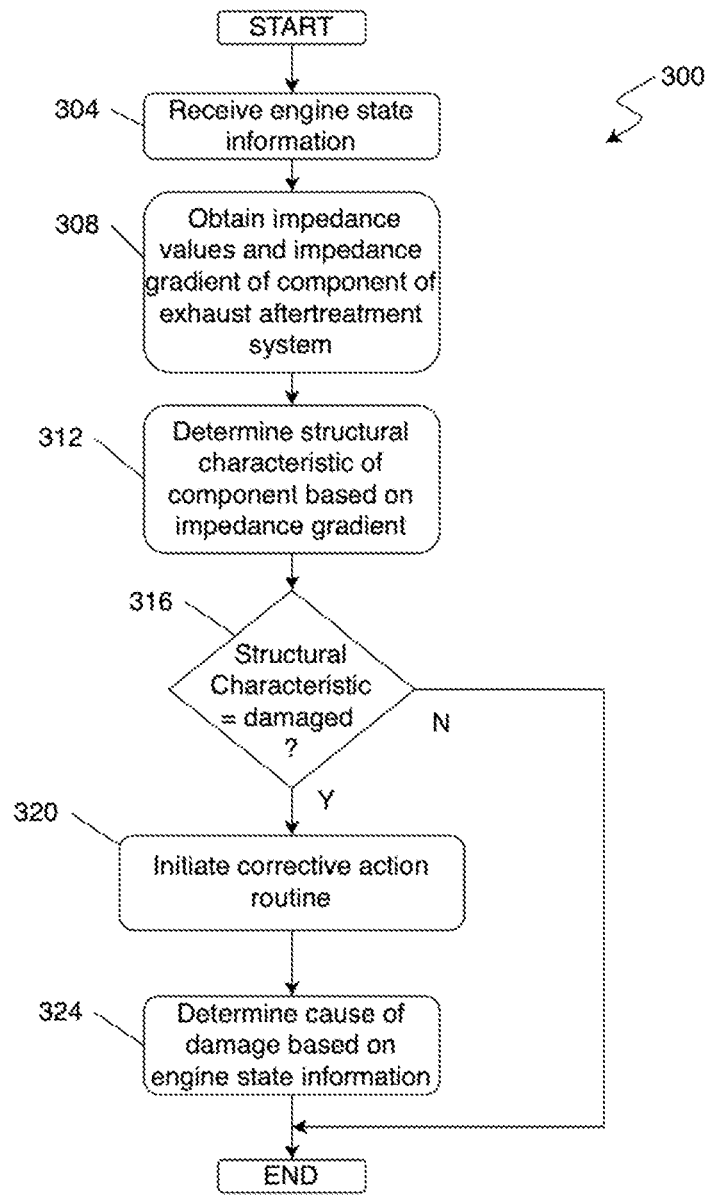
FIG. 3 is a flow chart for determining a structural characteristic and a cause of damage of an exhaust aftertreatment system component according to the teachings of the present disclosure.

Referring to FIG. 2, an example functional block diagram of the engine controller 115, the exhaust system 130, and the power regulator module 160 is shown. The power regulator module 160 may include a switching module 180, a voltage detection module 190, a switch control module 200, a current protection module 210, and an impedance detection module 220. In some forms, at least a portion of the power regulator module 160 is located on a microcontroller that includes a processor configured to execute instructions stored in a nontransitory computer-readable medium, such as a random-access memory (RAM) and/or a read-only memory (ROM). In other forms, at least a portion of the power regulator module 160 is communicatively coupled to an external microcontroller that includes a processor configured to execute instructions stored in a nontransitory computer-readable medium, such as a RAM and/or ROM.

The engine controller 115 may include a particulate mass determination module 230, a vehicle state module 240, a structural characteristic module 250, a lambda compensation module 260, a diagnostic module 265, a structural characteristic database 270, and an impedance database 280. In some forms, at least a portion of the engine controller 115 is located on or communicatively coupled with a microcontroller that includes a processor configured to execute instructions stored in a nontransitory computer-readable medium, such as a RAM and/or ROM.

The switching module 180 is configured to receive the electrical power from the power supply 150 and output a pulse width modulated (PWM) signal to a component of the exhaust aftertreatment system 134 (e.g., the particulate filter 138, the catalytic converter 136, among others). In some forms, the switching module 180 may include one or more switching devices, such as a bipolar junction transistor (BJT), an insulated gate bipolar transistor (IGBT), a metal-oxide semiconductor field-effect transistor (MOSFET), and/or the like. The operation of the switching module 180 may be controlled by the switch control module 200, as described below in further detail.

The voltage detection module 190 is configured to detect a voltage magnitude of the PWM signal output by the switching module 180. As an example, the voltage detection module 190 may include one or more resistors that form a voltage divider with the switching module 180 and/or the switch control module 200, an operational amplifier configured to detect the voltage magnitude, an integrated circuit configured to detect the voltage magnitude, an analog-to-digital converter (ADC) configured to output a digital signal representing the voltage magnitude, among others. The voltage magnitude may be provided to the switch control module 200, which subsequently controls the operation of the switching module 180 based on the voltage magnitude, as described below in further detail.

The switch control module 200 is configured to control the operation of the switching module 180 based on the voltage magnitude as determined by the voltage detection module 190. To control the operation of the switching module 180, the switch control module 200 is configured to selectively provide a biasing voltage to the switching devices of the switching module 180, thereby activating or deactivating the switching devices. Furthermore, the switch control module 200 may include an additional step-down voltage converter to convert the voltage magnitude of the electrical signal received from the power supply 150 to the biasing voltage magnitude.

The current protection module 210 is configured to limit the amount of current provided to the component of the exhaust aftertreatment system 134 when the power regulator module 160 is activated (e.g., turned on) and during steady-state operation of the power regulator module 160. Likewise, the current protection module 210 is configured to limit the amount of reverse current provided to the power regulator module 160 when the power regulator module 160 is deactivated (e.g., turned off). In some forms, the current protection module 210 may include a fuse, a thermistor, a network of transistors and/or diodes, an integrated circuit that provides active and resettable overcurrent protection, among others.

The impedance detection module 220 is configured to generate a signal indicating the impedance value of the component when it receives electrical power from the power regulator module 160. The impedance detection module 220 may include various combinations of passive or active electronic components used to indicate the impedance value of the component of the exhaust aftertreatment system 134. As an example, the impedance detection module 220 may include one or more resistors electrically coupled to the component of the exhaust aftertreatment system 134 such that a voltage divider circuit is formed. Based on the known resistance of the one or more resistors, the voltage magnitude of the PWM signal as determined by the voltage detection module 190, and a voltage magnitude of a common node of the one or more resistors and the component of the exhaust aftertreatment system 134, the impedance detection module 220 is configured to generate the signal indicating the resistance of the component of the exhaust aftertreatment system 134. As another example, the impedance detection module 220 may include a resistor-capacitor (RC) network, a resistor-inductor (RL) network, or a resistor-capacitor-inductor (RLC) network electrically coupled to the component of the exhaust aftertreatment system 134 such that a voltage divider circuit is formed. Based on the known reactance of the RC network, RL network, or RLC network, the voltage magnitude of the PWM signal as determined by the voltage detection module 190, and a voltage magnitude of a common node of one of the RC network, RL network, or RLC network and the component of the exhaust aftertreatment system 134, the impedance detection module 220 is configured to generate the signal indicating the reactance of the component of the exhaust aftertreatment system 134.

While the power regulator module 160 provides power to the component of the exhaust aftertreatment system 134, the impedance detection module 220 is configured to determine a plurality of impedance values of the component of the exhaust aftertreatment system 134. In some forms, the number of impedance values obtained by the impedance detection module 220 may be based on a duration and the pulse width of the signal provided to the component of the exhaust aftertreatment system 134. In response to determining the plurality of impedance values, the impedance detection module 220 is configured to store the measured impedance values as impedance values 282-1, 282-2, . . . 282-n (collectively referred to as impedance values 282) in the impedance database 280. As described below in further detail, the structural characteristic module 250 of the engine controller 115 is configured to determine various structural characteristics of the component of the exhaust aftertreatment system 134 based on the impedance values 282 of the impedance database 280. Non-limiting examples of structural characteristics of a component of the exhaust aftertreatment system 134 include melting and/or an estimated amount of melting of the exhaust aftertreatment system 134, cracking and/or an estimated amount of cracking of the component of the exhaust aftertreatment system 134, erosion and/or an estimated amount of erosion of the component of the exhaust aftertreatment system 134, among others.

The particulate mass determination module 230 is configured to determine the amount of particulate mass accumulated in the particulate filter 138 based on sensor data received from at least one of the pre-converter and post-converter particulate sensors 148a, 148b and the pre-converter and post-converter pressure sensors 149a, 149b.

The vehicle state module 240 is configured to receive engine state information associated with the vehicle 10 from the ICE 100 and the particulate mass determination module 230. The engine state information may include information representing an air-to-fuel ratio of the exhaust gas (i.e., the lambda value of the exhaust gas), an exhaust flow rate of the exhaust gas, an engine speed of the vehicle 10, a vehicle speed, among others.

Figure 4:
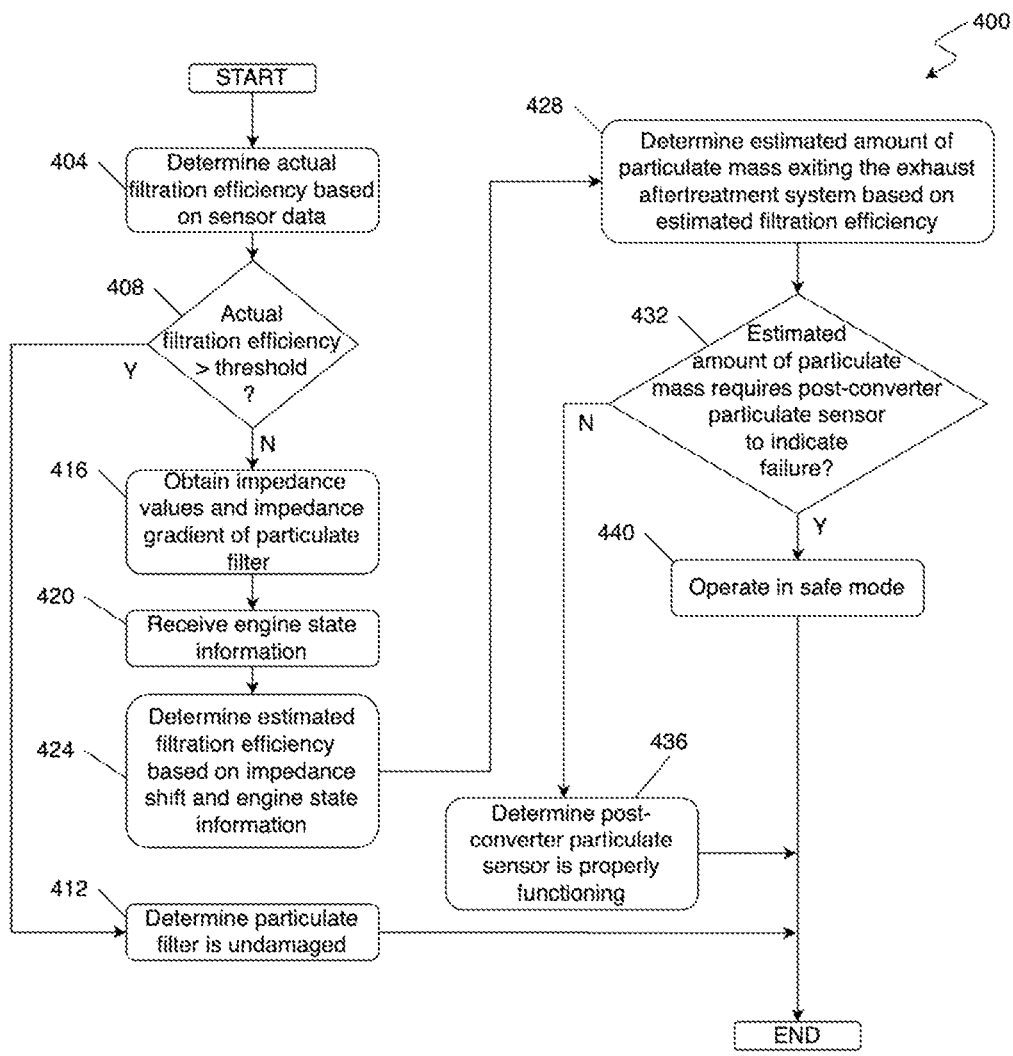
FIG. 4 is a flow chart for determining an operational characteristic of a sensor of the exhaust aftertreatment system according to the teachings of the present disclosure.

The vehicle state module 240 is also configured to determine an actual filtration efficiency of the exhaust aftertreatment system 134, an estimated filtration efficiency of the exhaust aftertreatment system 134, and operational characteristics of at least one of the sensors (e.g., the post-converter particulate sensor 149b). The vehicle state module 240 may determine the actual filtration efficiency as a function of the particulate mass entering the exhaust aftertreatment system 134 and the particulate mass exiting the exhaust aftertreatment system 134 (as indicated by the pre-converter and post-converter particulate sensors 148a, 148b). The vehicle state module 240 may determine the estimated filtration efficiency based on an impedance gradient of the particulate filter 138, as described below in further detail with reference to FIG. 4. The vehicle state module 240 may determine the operational characteristic of the post-converter pressure sensor 149b by comparing an output thereof to the estimated filtration efficiency, as described below in further detail with reference to FIG. 4. Non-limiting examples of an operational characteristic include whether the pre-converter and post-converter particulate sensors 148a, 148b are properly functioning, generating accurate sensor data, among others.

The structural characteristic module 250 is configured to determine whether the component of the exhaust aftertreatment system 134 is in a damaged state (e.g., the component has experienced melting, erosion, cracking, among others) or in an undamaged state. In some forms, the structural characteristic module 250 determines one of an impedance gradient and a temperature gradient of the component based on the impedance values 282. As used herein, the term "gradient" refers to a change in magnitude of a property as a function of time. The impedance gradient and the temperature gradient may represent an impedance change and a temperature change, respectively, as a function of time. As an example, if the impedance value 282-1 at time $T_1$ is $R_1$, and the impedance value 282-2 at time $T_2$ is $R_2$, the impedance gradient ($\Delta R$) may be represented using the following relation:

$$\Delta R = \frac{R_2 - R_1}{T_2 - T_1} \quad (1)$$

Likewise, the temperature gradient may represent a temperature change (as indicated by the impedance values 282) of the component as a function of time. As an example, if the temperature at time $T_1$ is $Tx_1$, and the temperature at time $T_2$ is $Tx_2$, the temperature gradient ($\Delta Tx$) may be represented using the following relation:

$$\Delta Tx = \frac{Tx_2 - Tx_1}{T_2 - T_1} \quad (2)$$

The structural characteristic module 250 is configured to determine whether the component is damaged by correlating at least one of the impedance gradient and the temperature gradient to a plurality of structural state values 272-1, 272-2, . . . 272-n (collectively referred to as structural state values 272) in the structural state database 270. Each of the structural state values 272 may correlate a unique impedance gradient and/or the temperature gradient to one or more expected impedance values, one or more expected temperature values, a threshold impedance change value, a threshold temperature change value, a particular type of damage, an amount of damage, and/or an estimated filtration efficiency reduction. As an example, structural state value 272-1 may correlate a first impedance gradient to expected impedance value of $R_{1expected}$ at time $T_1$, expected impedance value of $R_{2expected}$ at time $T_2$, and a threshold impedance change value of $R_{2expected}-R_{1expected}$ over a time period of $T_2-T_1$. As another example, structural state value 272-2 may correlate a second impedance gradient to a complete erosion of the catalyst material 142b of the catalytic converter 136. As yet another example, structural state value 272-n may correlate a third impedance gradient to the particulate filter 138 being cracked, a 5% reduction in surface area of the particulate filter 138, and a 10% estimated filtration efficiency reduction.

In response to the structural characteristic module 250 indicating that the component of the exhaust aftertreatment system 134 is in the damaged state, the lambda compensation module 260 is configured to adjust the A value of the exhaust gas flowing through the exhaust aftertreatment system 134. As an example, if the structural characteristic module 250 indicates that the particulate filter 138 is cracked and has a 5% reduction in surface area, the lambda compensation module 260 may transmit a signal to the ICE 100 to increase or decrease the A value of the exhaust gas to compensate for the surface area loss and/or assist in the oxidation of the particulate mass.

In some variations of the present disclosure, the A value of the exhaust gas is adjusted by the engine controller 115 controlling the flow of air (including volume of air) into and out of the one or more cylinders 120 for a predetermined amount of time such that a deactivated cylinder intake air pass-through volume flows through the at least one deactivated cylinder 120, into the exhaust pipe 132, and through the catalytic converter 136 and the particulate filter 138. That is, the engine controller 115 deactivates one or more cylinders 120 by directing the valves 122 (i.e., the intake valve and the exhaust valve) of each deactivated cylinder 120 to remain open for a first predetermined amount of time, the fuel injector 124 of each deactivated cylinder to remain closed for a second predetermined amount of time, and the spark initiator 126 of each deactivated cylinder 120 not to provide a spark for one or more combustion cycles. In some variations, the first predetermined amount of time is equal to the second predetermined amount of time, while in other variations the first predetermined amount of time is not equal to the second predetermined amount of time.

The diagnostic module 265 is configured to identify potential causes for the component of the exhaust aftertreatment system 134 being in the damaged state. In some forms, the diagnostic module 265 may compare the engine state information from the vehicle state module 240 with the structural characteristic as determined by the structural characteristic module 250. As an example, based on a rapid decrease in the vehicle speed at a time in which the impedance gradient indicates the component was cracked, the diagnostic module 265 may determine that a collision of the vehicle 10 caused the damage to the component. As another example, based on a rapid increase in the exhaust gas temperature at a time in which the impedance gradient indicates the component was cracked, the diagnostic module 265 may determine that the component was subjected to a thermal shock.

Referring to FIGS. 1A-1C and 2-3, an example routine 300 is shown. At 304, the engine controller 115 receives the engine state information. At 308, the power regulator module 160 obtains impedance values of the component of the exhaust aftertreatment system 134 (e.g., the particulate filter 138), and the engine controller 115 determines the impedance gradient of the component based on the impedance values (e.g., using relation (1) above). At 312, the engine controller 115 determines the structural characteristic of the component based on the impedance gradient. At 316, the engine controller 115 determines whether the structural characteristic indicates that the component is in the damaged state. As an example, the engine controller 115 may determine the component is in the damaged state if the impedance value at time $T_2$ (as indicated by $R_2$ of the impedance gradient) is less than expected impedance value at time $T_2$ (as indicated by the expected impedance value $R_{2expected}$ of the corresponding structural state value 272). As another example, the engine controller 115 may determine the component is in the damaged state if the impedance change value (as indicated by $R_2$ and $R_1$ of the impedance gradient) is greater than the threshold impedance change value (as indicated by the threshold impedance change value of $R_{2expected}-R_{1expected}$ of the corresponding structural state value 272). If the component is in the damaged state, the routine 300 proceeds to 320; otherwise, the routine 300 ends.

At 320, the engine controller 115 and/or the ICE 100 initiate a corrective action routine to address losses of the exhaust aftertreatment system 134 caused by the damaged component (e.g., adjusting the lambda value of the exhaust gas flowing through the exhaust aftertreatment system 134, reducing the engine speed of the ICE 100, among others). At 324, the engine controller 115 determines what may have caused the damage based on the engine state information. In some forms, the engine controller 115 may generate an alert, notification, among others, indicating the cause and/or the type of damage to the component of the exhaust aftertreatment system 134 (e.g., the engine controller 115 generates a signal that causes a dashboard, display, auditory alert system, haptic alert system, among others, to alert an occupant of the vehicle 10 of the cause and/or the type of damage to the component).

Referring to FIGS. 1A-1C, 2, and 4, an example routine 400 is shown. At 404, the engine controller 115 determines the actual filtration efficiency of the exhaust aftertreatment system 134, e.g., based on sensor data received from the pre-converter and post-converter particulate sensors 148a, 148b. As an example, the actual filtration efficiency may be represented as the amount of particulate mass detected by the post-converter particulate sensor 148b divided by the amount of particulate mass detected by the pre-converter particulate sensor 148a. At 408, the engine controller 115 determines whether the actual filtration efficiency of the exhaust aftertreatment system 134 is greater than a threshold value. If the actual filtration efficiency of the exhaust aftertreatment system 134 is greater than a threshold value, the routine 400 proceeds to 412, where the engine controller 115 determines that the particulate filter 138 is in an undamaged state. Conversely, if the actual filtration efficiency of the exhaust aftertreatment system 134 is less than or equal to the threshold value, the routine 400 proceeds to 416.

At 416, the power regulator module 160 obtains impedance values of the particulate filter 138, and the engine controller 115 determines the impedance gradient of the particulate filter 138 based on the impedance values (e.g., using relation (1) above). At 420, the engine controller 115 receives the engine state information.

At 424, the engine controller 115 determines the estimated particulate filtration efficiency of the particulate filter 138 based on the impedance gradient. As an example, the engine controller 115 may determine that, based on the impedance gradient, the particulate filter 138 is cracked, has a 5% reduction in surface area, and a 10% estimated filtration efficiency reduction (as indicated by one of the structural state values 272). At 428, the engine controller 115 determines an estimated amount of particulate mass exiting the exhaust aftertreatment system 134 based on the estimated filtration efficiency. As an example, the engine controller 115 may determine the estimated amount of particulate mass exiting the exhaust aftertreatment system 134 based on the amount of particulate mass detected by the pre-converter particulate sensor 148a (i.e., the amount of particulate mass flowing into the exhaust aftertreatment system 134) and the estimated filtration efficiency.

At 432, the engine controller 115 determines the operational characteristic by determining whether the estimated amount of particulate mass requires the post-converter particulate sensor 148b to indicate a failure of the exhaust aftertreatment system 134, a warning, among others. If the estimated amount of particulate mass requires the post-converter particulate sensor 148b to indicate a failure of a component of the exhaust aftertreatment system 134, the routine 400 proceeds to 440, otherwise the routine 400 proceeds to 436. At 436, the engine controller 115 determines the post-converter particulate sensor 148b is properly functioning. At 440, the engine controller 115 operates the vehicle 10 in a safe mode by inhibiting the exhaust aftertreatment system 134 from performing certain functions that generate high amounts of particulate mass. The routine 400 then ends.

By using the engine controller 115 and the power regulator module 160 described herein, the exhaust aftertreatment system 134 can accurately diagnose component failures, such as to the catalytic converter 136, the particulate filter 138, among others, without the use of or in conjunction with the temperature sensors.

Based on the foregoing, the following provides a general overview of the present disclosure and is not a comprehensive summary.

In some forms of the present disclosure, the structural state of the exhaust aftertreatment system component is one of a damaged state and an undamaged state.

In some forms of the present disclosure, the method further includes determining the exhaust aftertreatment system component is in the damaged state in response to the impedance value being less than an expected impedance value.

In some forms of the present disclosure, the method further includes determining the exhaust aftertreatment system component is in the damaged state in response to a change of the impedance value over a period of time exceeding a threshold change value.

In some forms of the present disclosure, the method further includes determining the exhaust aftertreatment system component is in the damaged state based on a comparison of the change of the impedance value to at least one of an exhaust flow rate of an exhaust flow of the exhaust aftertreatment system, an air-to-fuel ratio of the exhaust flow, an engine speed, and a vehicle speed.

In some forms of the present disclosure, obtaining the impedance value of the exhaust aftertreatment system component in response to providing the electric power further includes obtaining an impedance value from an impedance detection circuit in response to providing the electric power, where the impedance detection circuit is electrically coupled to the exhaust aftertreatment system component. In some forms of the present disclosure, obtaining the impedance value of the exhaust aftertreatment system component in response to providing the electric power further includes determining the impedance value of the exhaust aftertreatment system component based on the impedance value of the impedance detection circuit.

In some forms of the present disclosure, providing the electric power to the exhaust aftertreatment system component further includes selectively activating one or more switches of a switching circuit, where the switching circuit electrically couples the exhaust aftertreatment system component and a power supply.

In some forms of the present disclosure, the instructions further include determining the exhaust aftertreatment system component is in the damaged state in response to the impedance value being less than an expected impedance value.

In some forms of the present disclosure, the instructions further include determining the exhaust aftertreatment system component is in the damaged state in response to a change of the impedance value over a period of time exceeding a threshold change value.

In some forms of the present disclosure, the instructions further include determining the exhaust aftertreatment system component is in the damaged state based on a comparison of the change of the impedance value to at least one of an exhaust flow rate of an exhaust flow of the exhaust aftertreatment system, an air-to-fuel ratio of the exhaust flow, an engine speed, and a vehicle speed.

In some forms of the present disclosure, the instructions for obtaining the impedance value of the exhaust aftertreatment system component in response to providing the electric power further include obtaining an impedance value from an impedance detection circuit in response to providing the electric power, where the impedance detection circuit is electrically coupled to the exhaust aftertreatment system component. In some forms of the present disclosure, the instructions for obtaining the impedance value of the exhaust aftertreatment system component in response to providing the electric power further include determining the impedance value of the exhaust aftertreatment system component based on the impedance value of the impedance detection circuit.

In some forms of the present disclosure, the instructions for providing the electric power to the exhaust aftertreatment system component further includes selectively activating one or more switches of a switching circuit, where the switching circuit electrically couples the exhaust aftertreatment system component and a power supply.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and nontransitory. Non-limiting examples of a nontransitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method for monitoring an exhaust aftertreatment system of a vehicle including an internal combustion engine, the method comprising:
    providing electric power to an exhaust aftertreatment system component, wherein the exhaust aftertreatment system component is one of a particulate filter and an electrically heated catalyst;
    obtaining an impedance value of the exhaust aftertreatment system component in response to providing the electric power;
    determining a structural state of the exhaust aftertreatment system component based on the impedance value, wherein the structural state of the exhaust aftertreatment system component is one of a damaged state and an undamaged state, and wherein the exhaust aftertreatment system component is in the damaged state in response to a change of the impedance value over a period of time exceeding a threshold change value; and
    in response to the exhaust aftertreatment system component being in the damaged state;
        performing a corrective action, wherein the corrective action includes at least one of adjusting an air-to-fuel ratio of exhaust gas flowing through the exhaust aftertreatment system and reducing an engine speed of the internal combustion engine; and
        identifying a cause associated with the exhaust aftertreatment system component being in the damaged state based on at least one of an exhaust gas temperature and a vehicle speed, wherein the cause is a vehicle collision in response to a decrease of the vehicle speed occurring during the period of time, and wherein the cause is a thermal shock in response to an increase of the exhaust gas temperature occurring during the period of time.

2. The method of claim 1 further comprising determining the exhaust aftertreatment system component is in the damaged state in response to the impedance value being less than an expected impedance value.

3. The method of claim 1 further comprising determining the exhaust aftertreatment system component is in the damaged state in response to a change of the impedance value over a period of time exceeding a threshold change value.

4. The method of claim 3 further comprising determining the exhaust aftertreatment system component is in the damaged state based on a comparison of the change of the impedance value to at least one of an exhaust flow rate of an exhaust flow of the exhaust aftertreatment system, the air-to-fuel ratio of the exhaust flow, the engine speed, and a vehicle speed.

5. The method of claim 1, wherein obtaining the impedance value of the exhaust aftertreatment system component in response to providing the electric power further comprises:
    obtaining an impedance value from an impedance detection circuit in response to providing the electric power, wherein the impedance detection circuit is electrically coupled to the exhaust aftertreatment system component; and
    determining the impedance value of the exhaust aftertreatment system component based on the impedance value of the impedance detection circuit.

6. The method of claim 1, wherein providing the electric power to the exhaust aftertreatment system component further comprises selectively activating one or more switches of a switching circuit, wherein the switching circuit electrically couples the exhaust aftertreatment system component and a power supply.

7. A system for monitoring an exhaust aftertreatment system of a vehicle including an internal combustion engine, the system comprising:
    a processor; and
    a nontransitory computer-readable medium comprising instructions that are executable by the processor, wherein the instructions comprise:

providing electric power to an exhaust aftertreatment system component, wherein the exhaust aftertreatment system component is one of a particulate filter and an electrically heated catalyst;

obtaining an impedance value of the exhaust aftertreatment system component in response to providing the electric power;

determining a structural state of the exhaust aftertreatment system component based on the impedance value, wherein the structural state of the exhaust aftertreatment system component is one of a damaged state and an undamaged state, and wherein the structural state is the damaged state in response to a change of the impedance value over a period of time exceeding a threshold change value; and in response to the exhaust aftertreatment system component being in the damaged state;

performing a corrective action, wherein the corrective action includes of adjusting an air-to-fuel ratio of exhaust gas flowing through the exhaust aftertreatment system and reducing an engine speed of the internal combustion engine; and identifying a cause associated with the exhaust aftertreatment system component being in the damaged state based on at least one of an exhaust gas temperature and a vehicle speed, wherein the cause is a vehicle collision in response to a decrease of the vehicle speed occurring during the period of time, and wherein the cause is a thermal shock in response to an increase of the exhaust gas temperature occurring during the period of time.

8. The system of claim 7, wherein the instructions further comprise determining the exhaust aftertreatment system component is in the damaged state in response to the impedance value being less than an expected impedance value.

9. The system of claim 7, wherein the instructions further comprise determining the exhaust aftertreatment system component is in the damaged state in response to a change of the impedance value over a period of time exceeding a threshold change value.

10. The system of claim 9, wherein the instructions further comprise determining the exhaust aftertreatment system component is in the damaged state based on a comparison of the change of the impedance value to at least one of an exhaust flow rate of an exhaust flow of the exhaust aftertreatment system, the air-to-fuel ratio of the exhaust flow, the engine speed, and a vehicle speed.

11. The system of claim 7, wherein the instructions for obtaining the impedance value of the exhaust aftertreatment system component in response to providing the electric power further comprise:

obtaining an impedance value from an impedance detection circuit in response to providing the electric power, wherein the impedance detection circuit is electrically coupled to the exhaust aftertreatment system component; and determining the impedance value of the exhaust aftertreatment system component based on the impedance value of the impedance detection circuit.

12. The system of claim 7, wherein the instructions for providing the electric power to the exhaust aftertreatment system component further comprise selectively activating one or more switches of a switching circuit, and wherein the switching circuit electrically couples the exhaust aftertreatment system component and a power supply.

13. A vehicle including an internal combustion engine, the vehicle comprising:

an exhaust aftertreatment system component, wherein the exhaust aftertreatment system component is one of a particulate filter and an electrically heated catalyst;

a processor; and a nontransitory computer-readable medium comprising instructions that are executable by the processor, wherein the instructions comprise:

providing electric power to the exhaust aftertreatment system component;

obtaining an impedance value of the exhaust aftertreatment system component in response to providing the electric power;

determining a structural state of the exhaust aftertreatment system component based on the impedance value, wherein the structural state of the exhaust aftertreatment system component is one of a damaged state and an undamaged state, and wherein the structural state is the damaged state in response to a change of the impedance value over a period of time exceeding a threshold change value; and in response to the exhaust aftertreatment system component being in the damaged state;

performing a corrective action, wherein the corrective action includes at least one of adjusting an air-to-fuel ratio of exhaust gas flowing through the exhaust aftertreatment system and reducing an engine speed of the internal combustion engine; and identifying a cause associated with the exhaust aftertreatment system component being in the damaged state based on an exhaust gas temperature and a vehicle speed, wherein the cause is a vehicle collision in response to a decrease of the vehicle speed occurring during the period of time, and wherein the cause is a thermal shock in response to an increase of the exhaust gas temperature occurring during the period of time.

14. The vehicle of claim 13, wherein the instructions further comprise determining the exhaust aftertreatment system component is in the damaged state in response to the impedance value being less than an expected impedance value.

15. The vehicle of claim 13, wherein the instructions further comprise determining the exhaust aftertreatment system component is in the damaged state in response to a change of the impedance value over a period of time exceeding a threshold change value.

16. The vehicle of claim 15, wherein the instructions further comprise determining the exhaust aftertreatment system component is in the damaged state based on a comparison of the change of the impedance value to at least one of an exhaust flow rate of an exhaust flow of the exhaust aftertreatment system, the air-to-fuel ratio of the exhaust flow, the engine speed, and a vehicle speed.

17. The vehicle of claim 13, wherein the instructions for obtaining the impedance value of the exhaust aftertreatment system component in response to providing the electric power further comprise:

obtaining an impedance value from an impedance detection circuit in response to providing the electric power, wherein the impedance detection circuit is electrically coupled to the exhaust aftertreatment system component; and determining the impedance value of the exhaust aftertreatment system component based on the impedance value of the impedance detection circuit.

\* \* \* \* \*